United States Patent
Watanabe

(10) Patent No.: US 10,047,846 B2
(45) Date of Patent: Aug. 14, 2018

(54) FLUID TRANSMISSION DEVICE

(71) Applicant: SUBARU CORPORATION, Tokyo (JP)

(72) Inventor: Takeshi Watanabe, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/415,292

(22) Filed: Jan. 25, 2017

(65) Prior Publication Data

US 2017/0254398 A1 Sep. 7, 2017

(30) Foreign Application Priority Data

Mar. 3, 2016 (JP) ................................. 2016-041296

(51) Int. Cl.
*F16H 45/02* (2006.01)
*F16F 15/14* (2006.01)

(52) U.S. Cl.
CPC ......... *F16H 45/02* (2013.01); *F16F 15/1457* (2013.01); *F16H 2045/0226* (2013.01)

(58) Field of Classification Search
CPC ..... F16H 2045/0263; F16H 2045/0226; F16H 2045/0231; F16H 45/02; F16F 15/1428
See application file for complete search history.

(56) References Cited

U.S. PATENT DOCUMENTS

| | | | | |
|---|---|---|---|---|
| 5,062,517 A | * | 11/1991 | Muchmore | ........... F16F 15/126 188/380 |
| 5,605,210 A | | 2/1997 | Koike et al. | |
| 5,992,589 A | * | 11/1999 | Fukushima | ............. F16H 45/00 192/3.29 |
| 6,006,879 A | | 12/1999 | Sudau | |
| 6,293,380 B1 | | 9/2001 | Arhab | |
| 2014/0124319 A1 | | 5/2014 | Bertram | |

FOREIGN PATENT DOCUMENTS

| | | |
|---|---|---|
| DE | 19981455 B4 | 5/2011 |
| DE | 102013210043 A1 | 12/2013 |
| JP | 07-180768 A | 7/1995 |
| JP | 2014-141987 A | 8/2014 |

OTHER PUBLICATIONS

Office Action issued in corresponding German Patent Application No. 102017101244.3, dated Sep. 18, 2017.

* cited by examiner

*Primary Examiner* — Stacey A Fluhart
(74) *Attorney, Agent, or Firm* — McDermott Will & Emery LLP

(57) ABSTRACT

A fluid transmission device is capable of transmitting power between a first rotating element and a second rotating element by kinetic energy of a fluid and capable of transmitting power between the first rotating element and the second rotating element via a lock-up clutch. The device includes a first damping mechanism and a coupling mechanism. The first damping mechanism is disposed in a path for transmitting power between the first rotating element and the second rotating element via a lock-up clutch for restraining variations in rotation of the second rotating element. The coupling mechanism is configured to release the first damping mechanism from the first rotating element and the second rotating element when the lock-up clutch is released and couple the first damping mechanism to the first rotating element and the second rotating element when the lock-up clutch is engaged.

14 Claims, 6 Drawing Sheets

FLUID TRANSMISSION DEVICE

CROSS-REFERENCE TO RELATED APPLICATIONS

The present application claims priority from Japanese Patent Application No. 2016-041296 filed on Mar. 3, 2016, the entire contents of which are hereby incorporated by reference.

BACKGROUND

1. Technical Field

The present invention relates to a fluid transmission device that transmits power between a first rotating element and a second rotating element by kinetic energy of a fluid and, specifically, to a fluid transmission device including a lock-up clutch.

2. Related Art

In the related art, an example of a fluid transmission device that transmits power between a first rotating element and a second rotating element by kinetic energy of a fluid is disclosed in Japanese Unexamined Patent Application Publication (JP-A) No. 2014-141987. The fluid transmission device described in JP-A-2014-141987 includes a front cover that receives power from an engine as the first rotating element, an impeller fixed to the front cover, a turbine hub that is coupled to an input shaft of a transmission as the second rotating element, a turbine shell fixed to the turbine hub, and a stator disposed between the impeller and the turbine shell.

The fluid transmission device is provided with a lock-up clutch. The lock-up clutch includes a piston mounted on the turbine hub as the second rotating element, a first plate fixed to the turbine hub, and a first torsion spring that transmits power between the piston and the first plate. A dynamic damper is mounted on the first plate. The dynamic damper includes a hub flange mounted on the first plate, a second torsion spring disposed between the hub flange and the first plate, and an inertia member fixed to an outer peripheral end of the hub flange.

According to the fluid transmission device described in JP-A No. 2014-141987, in a state in which the front cover and the impeller are rotating, hydraulic oil flows from the impeller to the turbine, and power is transmitted from the impeller to the turbine via the hydraulic oil. The power transmitted to the turbine is transmitted to the input shaft via the turbine hub. When the number of rotations of the input shaft is smaller than a certain value, the lock-up clutch is released.

When the number of rotations of the input shaft reaches the certain value, a piston moves toward the engine side by a hydraulic pressure, and a friction member is pressed against the front cover. In other words, the lock-up clutch is engaged, the piston rotates integrally with the front cover, and the power is transmitted from the front cover to the turbine hub via the piston and the first torsion spring.

When an engine speed is lowered, an amount of variation caused by the engine speed is increased by variations of combustion. According to the fluid transmission device described in JP-A No. 2014-141987, when the engine speed gets close to a specific value, the dynamic damper activates to restrain variations in the state of rotation of the turbine.

However, according to the fluid transmission device described in JP-A No. 2014-141987, the mass of the dynamic damper acts on the second rotating element also when the lock-up clutch is OFF. Therefore, an increase in rotational speed of the second rotating element may be disadvantageously impaired with the lock-up clutch released.

SUMMARY OF THE INVENTION

It is an object of the invention to provide a fluid transmission device that restrains impairment of an increase in rotational speed of a second rotating element with a lock-up clutch released.

An aspect of the present invention provides a fluid transmission device capable of transmitting power between a first rotating element and a second rotating element by kinetic energy of a fluid and capable of transmitting power between the first rotating element and the second rotating element via a lock-up clutch. The device includes a first damping mechanism disposed in a path for transmitting power between the first rotating element and the second rotating element via the lock-up clutch for restraining variations in rotation of the second rotating element, and a coupling mechanism configured to release the first damping mechanism from the first rotating element and the second rotating element when the lock-up clutch is released, and couples the first damping mechanism to the first rotating element and the second rotating element when the lock-up clutch is engaged.

The lock-up clutch may include a movable element mounted on the second rotating element and movable in a direction of an axial line, which is a center of rotation of the second rotating element, a first friction member disposed on the first rotating element, and a second friction member disposed on the movable element. Engagement of the lock-up clutch may be a state in which power transmission between the first friction member and the second friction member is enabled. Release of the lock-up clutch may be a state in which power transmission between the first friction member and the second friction member is blocked. The first damping mechanism may be apart from the first friction member and the second friction member when the lock-up clutch is released. The first damping mechanism may be coupled to the first friction member and the second friction member when the lock-up clutch is engaged.

The fluid transmission device may include a second damping mechanism configured to couple the movable element and the second rotating element, and restrain the variations in rotation of the second rotating element. The movable element may be rotatable with respect to the second rotating element about the axial line.

The first damping mechanism may include a ring mounted on the first rotating element so as to be rotatable about the axial line, and a mass body mounted on the ring and pivotable in the direction of rotation of the ring. The ring may move away from the first friction member and the second friction member when the lock-up clutch is released. The ring may be coupled to the first friction member and the second friction member when the lock-up clutch is engaged.

The mass body may be disposed outside the ring in a radial direction about the axial line.

The mass may be disposed inside the ring in the radial direction about the axial line.

DETAILED DESCRIPTION

An example of a fluid transmission device will be described below specifically with reference to the drawings.

Figure 1:
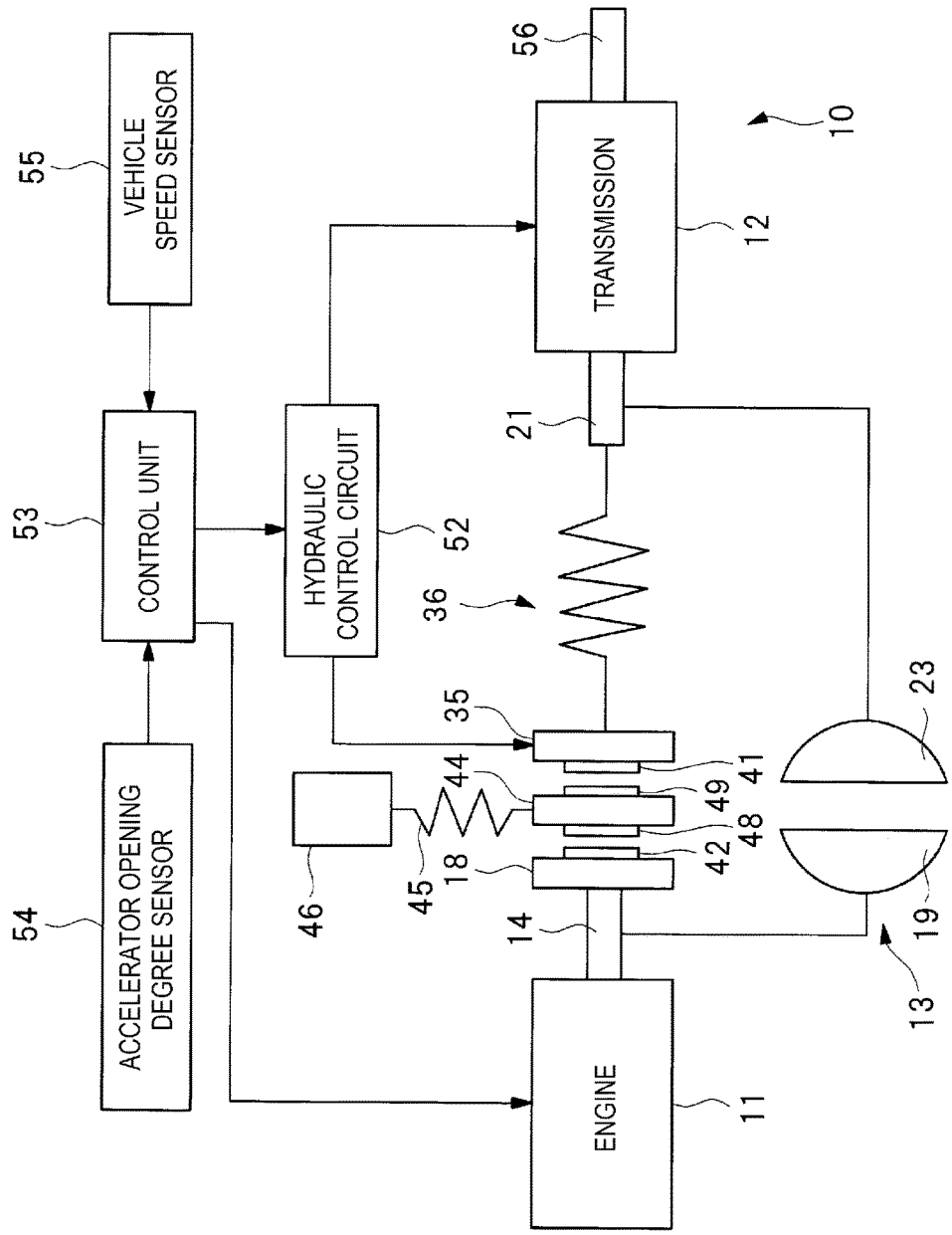
FIG. 1 is a conceptual drawing illustrating a configuration of a vehicle having a torque converter.
Figure 2:
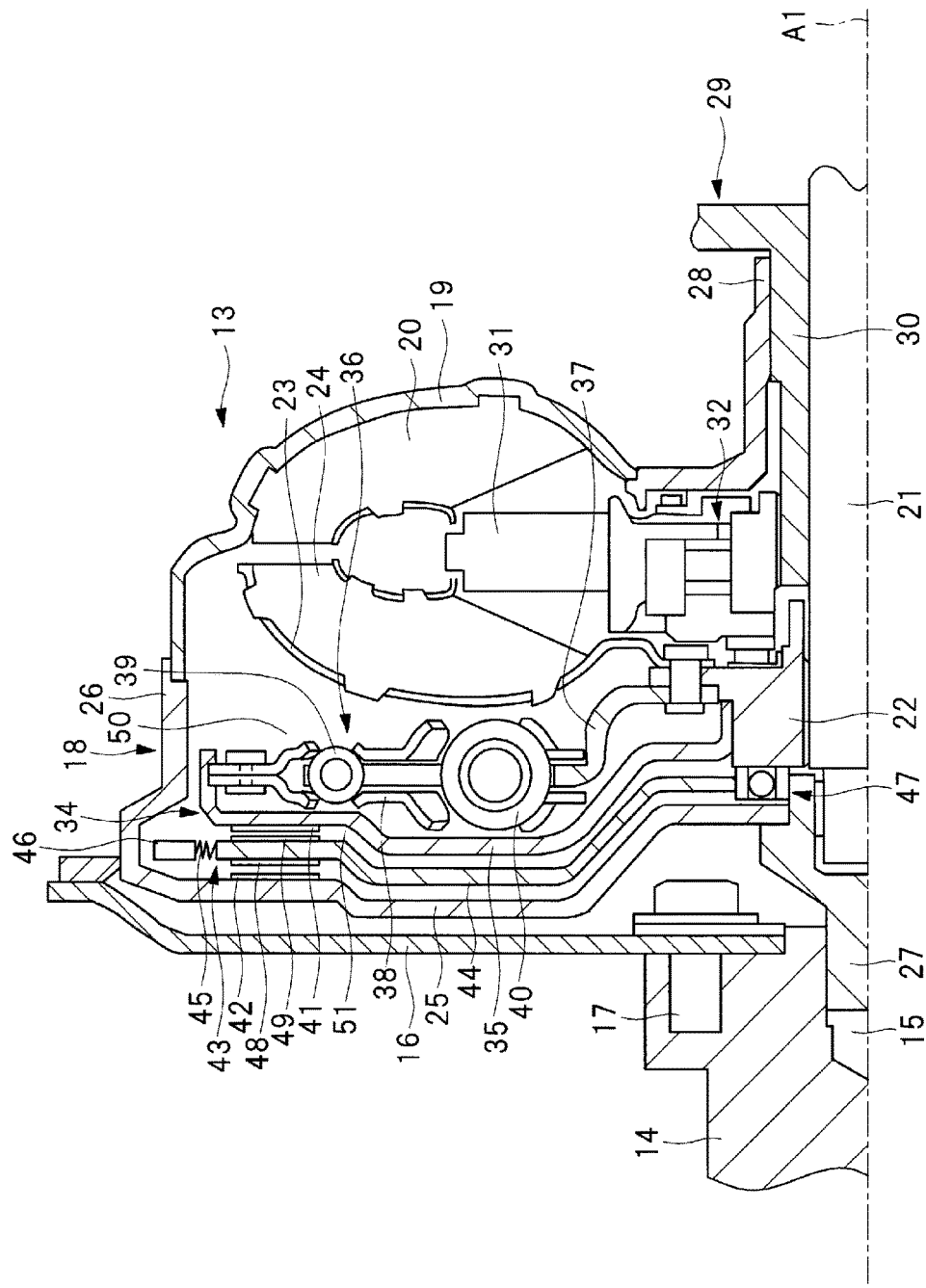
FIG. 2 is a cross-sectional view illustrating an illustrative example of the torque converter.
Figure 3:
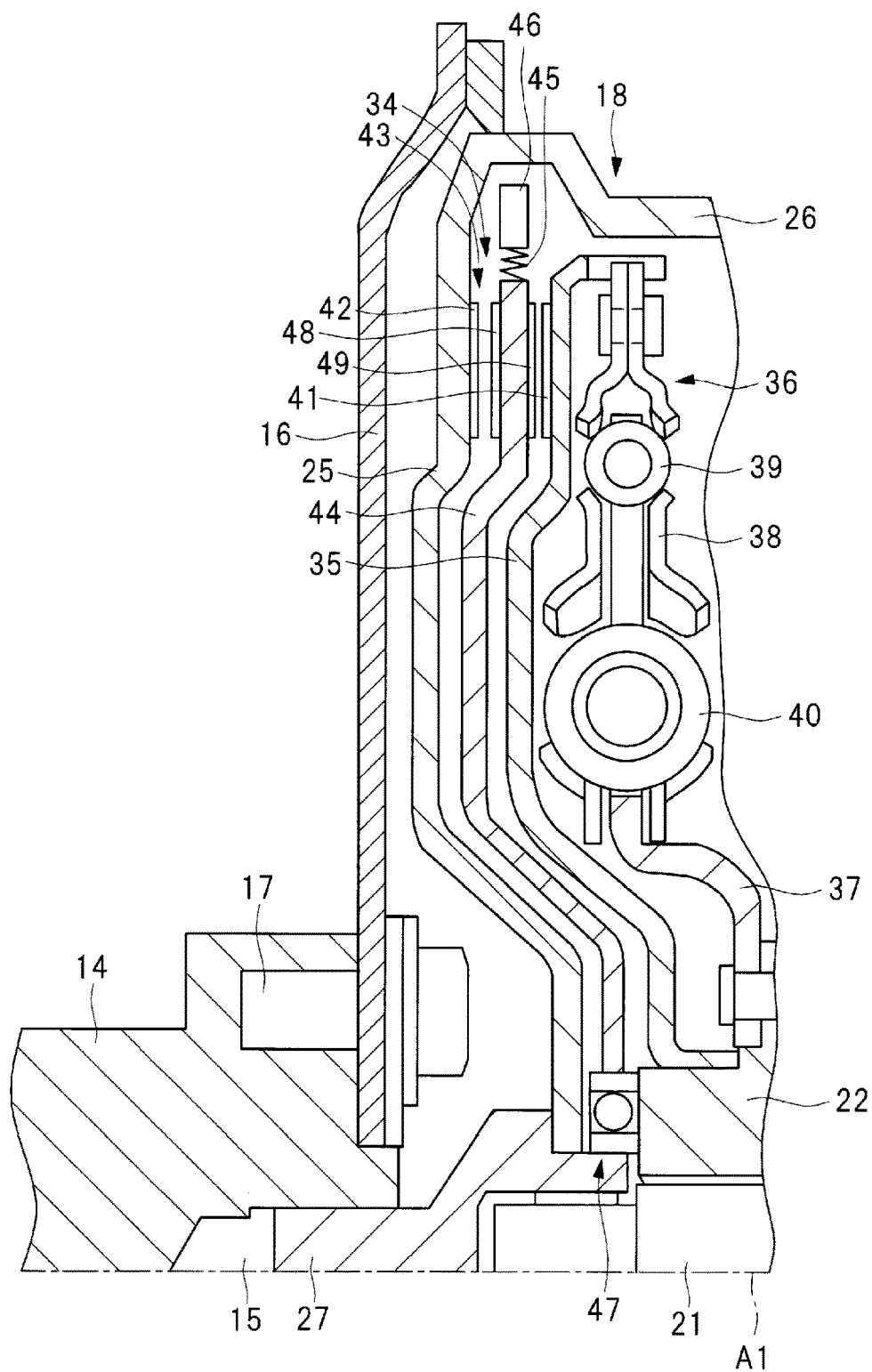
FIG. 3 is an enlarged cross-sectional view illustrating a structural example of a dynamic damper provided on the torque converter.

A vehicle 10 illustrated in FIG. 1 is provided with a torque converter 13 as a fluid transmission device in a power transmission path extending from an engine 11 to a transmission 12. The engine 11 is a drive power source that generates power by burning fuel. The engine 11 may be any of a gasoline engine, a diesel engine, and a liquefied propane gas engine. The engine 11 has a crank shaft 14, and the crank shaft 14 is supported so as to be rotatable about an axial line A1 as illustrated in FIG. 2 and FIG. 3. A supporting hole 15 is provided at an end of the crank shaft 14.

A drive plate 16 is fixed to the crank shaft 14 with a bolt 17. The drive plate 16 has a disc shape and is disposed in a radial direction about the axial line A1.

The transmission 12 is a power transmission mechanism including an input shaft 21 and an output shaft 56, and being capable of changing transmission gear ratio between the input shaft 21 and the output shaft 56. The output shaft 56 is coupled to drive wheels to transmit power thereto. The transmission 12 may either be one of continuously variable transmission and traditional transmission. The continuously variable transmission includes a belt-type continuously variable transmission, and the traditional transmission includes a transmission having a planetary gear mechanism. Here, the transmission 12 is a continuously variable transmission in which transmission gear ratio is controlled by hydraulic pressure control.

The torque converter 13 includes a front cover 18, a rear cover 19, a pump impeller 20 provided on the rear cover 19, a hub 22 mounted on the input shaft 21 of the transmission 12, a turbine shell 23 fixed to the hub 22, and a turbine runner 24 provided on the turbine shell 23. Hydraulic oil is supplied into a space defined by the front cover 18 and the rear cover 19. The turbine shell 23 is disposed between the drive plate 16 and the rear cover 19 in a direction of the axial line A1.

The front cover 18 has an annular shape formed of a metallic material. The front cover 18 includes abase portion 25 extending in the radial direction, and a cylindrical portion 26 extending from an outer peripheral end of the base portion 25 in the direction of the axial line A1. The front cover 18 is fixed to the drive plate 16. A pilot boss 27 is disposed in the supporting hole 15, and an inner peripheral end of the front cover 18 is fixed to the pilot boss 27.

The rear cover 19 has an annular shape, and an outer peripheral end of the rear cover 19 is fixed to the cylindrical portion 26 of the front cover 18. A sleeve 28 is fixed to inner peripheral end of the rear cover 19, and the sleeve 28 is supported by a cylindrical portion 30 of a casing 29. The input shaft 21 is disposed in the cylindrical portion 30, and the input shaft 21 is supported by the cylindrical portion 30 so as to be rotatable about the axial line A1. The axial line A1 corresponds to centers of rotation of the crank shaft 14, the hub 22, and the input shaft 21.

The casing 29 is a fixed element, and the cylindrical portion 30 is provided so that a center thereof is aligned with the axial line A1. The sleeve 28 is rotatably supported by the cylindrical portion 30. A stator 31 is disposed between the rear cover 19 and the turbine shell 23, and the stator 31 is supported by the casing 29 via a one-way clutch 32.

The hub 22 is spline-fitted to the input shaft 21, and the hub 22 rotates integrally with the input shaft 21. A lock-up clutch 34 is disposed in a space surrounded by the front cover 18 and the rear cover 19. The lock-up clutch 34 is a mechanism that transmits power by a frictional force between the front cover 18 and the hub 22. The lock-up clutch 34 includes a lock-up piston 35 mounted on the hub 22, a friction member 41 provided on a side surface of the lock-up piston 35, and a friction member 42 fixed to the base portion 25.

The lock-up piston 35 has an annular shape formed of a metallic material, and is mounted on an outer peripheral surface of the hub 22. The lock-up piston 35 is movable with respect to the hub 22 in the direction of the axial line A1.

The lock-up piston 35 is disposed between the base portion 25 of the front cover 18 and the turbine shell 23 in the direction of the axial line A1. The lock-up piston 35 is rotatable with respect to the hub 22. The friction member 41 is fixed to one of side surfaces of the lock-up piston 35 formed at different positions in the direction of the axial line A1, that is, to the side surface closer to the base portion 25. The friction member 42 is fixed to one of side surfaces of the base portion 25 formed at different positions in the direction of the axial line A1, that is, to the side surface closer to the lock-up piston 35. The friction members 41 and 42 are provided along a circumferential direction about the axial line A1.

A torsional damper 36 that forms a power transmission path between the lock-up piston 35 and the hub 22 is provided. The torsional damper 36 is disposed between the turbine shell 23 and the lock-up piston 35 in the direction of the axial line A1. The torsional damper 36 includes an annular plate 37 fixed to the hub 22, an annular holder 38 mounted on the lock-up piston 35, and compression coil springs 39 and 40 supported by the holder 38.

The compression coil springs 39 and 40 are formed of a metal, and are expandable in a direction of rotation of the hub 22 about the axial line A1. The compression coil springs 39 and 40 are different from each other in spring constant. A plurality of the compression coil springs 39 and 40 are provided along the direction of rotation of the plate 37. The plate 37 and the holder 38 are formed of a metal. The holder 38 is movable with respect to the lock-up piston 35 in the direction of the axial line A1, and integrally rotates with the lock-up piston 35.

Figure 4A:
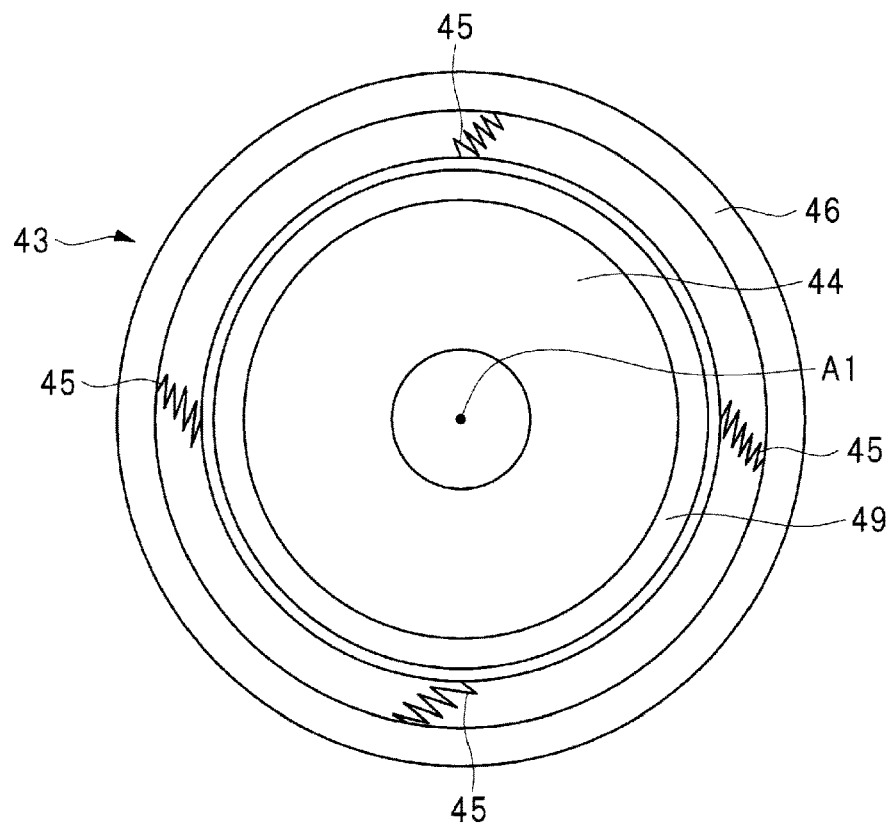
FIG. 4A is a side view illustrating the structural example of the dynamic damper.

A dynamic damper 43 is disposed between the base portion 25 and the lock-up piston 35 in the direction of the axial line A1. The dynamic damper 43 includes a metallic ring 44, and a metallic mass body 46 attached via the resilient members 45 outside the ring 44. The mass body 46 has an annular shape as illustrated in FIG. 4A. A plurality of the resilient members 45, which are metallic tension springs, are provided along the circumferential direction of the mass body 46. First end portions of all of the resilient members 45 are coupled to an outer peripheral end of the ring 44, and second end portions of all of the resilient members 45 are coupled to an inner peripheral end of the mass body 46.

The ring 44 is supported by the pilot boss 27 via a bearing 47. Therefore, the ring 44 is rotatable with respect to the pilot boss 27 about the axial line A1. The ring 44 is also movable with respect to the front cover 18 in the direction of the axial line A1. Friction members 48 are provided on first both side surfaces of the ring 44 and friction members 49 are provided on second both side surfaces of the ring 44 in the direction of the axial line A1.

A plurality of each of the friction members 48 and 49 are disposed in the circumferential direction of the ring 44. The friction members 48 are fixed to the ring 44 at positions opposing the friction member 42, and the friction members 49 are fixed to the ring 44 at positions opposing the frictional member 41. The friction members 41, 42, 48, and 49 are disposed in the same range in the radial direction about the axial line A1.

In an interior of the torque converter 13, an apply chamber 50 is formed between the turbine shell 23 and the lock-up piston 35, and a release chamber 51 is formed between the base portion 25 of the front cover 18 and the lock-up piston 35. The apply chamber 50 and the release chamber 51 are coupled to a hydraulic control circuit 52. The hydraulic control circuit 52 includes various types of valves and oil passages, and the hydraulic control circuit 52 has a function of controlling a hydraulic pressure of the apply chamber 50 and a hydraulic pressure of the release chamber 51, and a function of controlling the transmission gear ratio of the transmission 12.

A control unit 53 that controls a valve of the hydraulic control circuit 52 is provided. The control unit 53 is a microcomputer provided with a central processing unit, a memory unit, an input interface, and an output interface. The vehicle 10 includes an accelerator opening degree sensor 54 and a vehicle speed sensor 55. The accelerator opening degree sensor 54 detects an operating amount of the accelerator pedal that an occupant of the vehicle 10 operates, and outputs a signal corresponding to a result of detection. The vehicle speed sensor 55 detects a traveling speed of the vehicle 10, and outputs a signal in accordance with the result of detection. The control unit 53 receives a signal output from the accelerator opening degree sensor 54, a signal output from the vehicle speed sensor 55, and signals output from other sensors and switches.

The control unit 53 controls the engine 11 and the transmission 12 based on signals to be input and data memorized in the memory unit. The control unit 53, for instance, controls a torque of the engine 11 based on vehicle speed and accelerator position, and controls the transmission gear ratio of the transmission 12. The number of rotations of the engine 11 is controlled by controlling the transmission gear ratio of the transmission 12.

The control unit 53 also controls a hydraulic pressure in the apply chamber 50 and a hydraulic pressure in the release chamber 51 based on the signals to be input and the data stored in the memory unit. In other words, the control unit 53 controls engagement and release of the lock-up clutch 34.

Therefore, a control map as data for engaging and releasing the lock-up clutch 34 is stored in the memory unit of the control unit 53. The control map includes a first range where the lock-up clutch 34 is to be released and a second range where the lock-up clutch 34 is to be engaged set with the vehicle speed and the accelerator position as parameters.

For instance, in an operating state in which a combustion state of the engine 11 is unstable, and thus variations in rotation of the crank shaft 14 occurs easily, the first range of the control map is set for allowing the lock-up clutch 34 to be released. In the operating state in which the combustion state of the engine 11 is stable, and thus variations in rotation of the crank shaft 14 do not occur easily, the second range of the control map is set for allowing the lock-up clutch 34 to be engaged.

Subsequently, function of the torque converter 13 of the vehicle 10 will be described. A torque of the crank shaft 14 of the engine 11 is transmitted to the rear cover 19 via the drive plate 16. When the vehicle speed and the accelerator position are in the first range, the hydraulic pressure in the apply chamber 50 is controlled to be a low pressure, and the hydraulic pressure in the release chamber 51 is controlled to be a high pressure, so that the lock-up clutch 34 is released. In other words, a state in which the friction member 42 and the friction member 48 are apart from each other, and the friction member 41 and the friction member 49 are apart from each other is achieved. In other words, when the lock-up clutch 34 is released, power transmission between the friction member 42 and the friction member 41 is blocked.

If the lock-up clutch 34 is released, power is transmitted between the rear cover 19 and the turbine shell 23 by kinetic energy of the hydraulic oil. A torque of the turbine shell 23 is transmitted to the input shaft 21 of the transmission 12 via the hub 22. The torque transmitted to the input shaft 21 of the transmission 12 is transmitted to drive wheels via the output shaft 56, so that a drive force is generated. If the lock-up clutch 34 is released, torque variations, if occurred in the engine 11, are absorbed by slippage between the rear cover 19 and the turbine shell 23, so that transmission of the torque variations in the engine 11 to the transmission 12 may be restrained.

In a converter range in which a ratio between the rotational speed of the rear cover 19 and the rotational speed of the turbine shell 23 is no higher than a predetermined value, a torque to be transmitted from the rear cover 19 to the turbine shell 23 is amplified by a function of the stator 31. In a coupling range in which the ratio between the rotational speed of the rear cover 19 and the rotational speed of the turbine shell 23 exceeds the predetermined value, the torque to be transmitted from the rear cover 19 to the turbine shell 23 is not amplified.

In addition, if the lock-up clutch 34 is released, the dynamic damper 43 is rotatable with respect to the front cover 18 and the lock-up piston 35. Therefore, if the lock-up clutch 34 is released while the front cover 18 and the hub 22 are rotating, the dynamic damper 43 acts neither on the engine 11 nor on the hub 22 as an inertia mass body in the direction of rotation.

In contrast, when the vehicle speed and the accelerator position are in the second range, the hydraulic pressure in the apply chamber 50 is controlled to be a high pressure, and the hydraulic pressure in the release chamber 51 is controlled to be a low pressure, so that the lock-up clutch 34 is engaged. In other words, the lock-up piston 35 moves toward the base portion 25 in the direction of the axial line A1, the friction member 48 is pressed against the friction member 42, and the friction member 41 is pressed against the friction member 49. The ring 44 is brought into a state of being interposed between the friction members 41 and 42, and power of the front cover 18 is transmitted to the lock-up piston 35 by a frictional force. When the lock-up clutch 34 is engaged, power is transmitted between the friction member 42 and the friction member 41.

A high pressure and a low pressure in the apply chamber 50 and a low pressure and a high pressure in the release chamber 51 mean a relative relationship between the hydraulic pressure in the apply chamber 50 and the hydraulic pressure in the release chamber 51. In other words, there is no threshold value or reference value that discriminate the high pressure and the low pressure.

The torque of the lock-up piston 35 is transmitted to the hub 22 via the torsional damper 36. If variations in rotation of the crank shaft 14 occur with the lock-up clutch 34 engaged, the compression coil springs 39 and 40 of the torsional damper 36 expand and contract to absorb or attenuate the variations in rotation. Therefore, variations in rotation of the hub 22 and the input shaft 21, for instance, a change in rotational speed and variations in torque may be restrained.

When the lock-up clutch 34 is engaged, the rotational speed of the ring 44 becomes the same as the rotational speeds of the front cover 18 and the lock-up piston 35. Therefore, the mass body 46 acts on the hub 22 and the input shaft 21 as the inertia mass body in the direction of rotation. Therefore, if the variations in rotation of the crank shaft 14 occur, the resilient members 45 act as dynamic dampers, so that the mass body 46 absorbs or attenuates vibrations of the hub 22 and the input shaft 21 in the direction of rotation. Therefore, in a top slow range, that is, in a range in which the transmission gear ratio of the transmission 12 is small and the vehicle 10 travels at a low speed, sound is prevented from being confined.

If the lock-up clutch 34 is released, the dynamic damper 43 acts neither on the engine 11 nor on the hub 22 as the inertia mass body in the direction of rotation. Therefore, an increase in rotational speed of the input shaft 21, that is, acceleration of the vehicle 10 is prevented from being impaired, and an increase in amount of consumption of fuel of the engine 11 may be restrained.

Furthermore, if the lock-up clutch 34 is released, the dynamic damper 43 acts neither on the engine 11 nor on the hub 22 as an inertia mass body in the direction of rotation. Therefore, both when the engine 11 in halt is started and when the rotating engine 11 is stopped in a state in which the lock-up clutch 34 is released, the dynamic damper 43 is prevented from vibrating and thus abnormal noise is restrained.

The ring 44 and the friction members 48 and 49, which are elements of the dynamic damper 43 also serve as part of elements of the lock-up clutch 34. In other words, the lock-up clutch 34 has the similar structure to a multi-disc clutch. Therefore, the number of components of the torque converter 13 are restrained from increasing, and a required torque capacity is secured without increasing outer diameters of the friction members 48 and 49. Therefore, a reduction in manufacturing cost of the torque converter 13 is achieved, and a reduction in size of the torque converter 13 is also achieved.

Figure 4B:
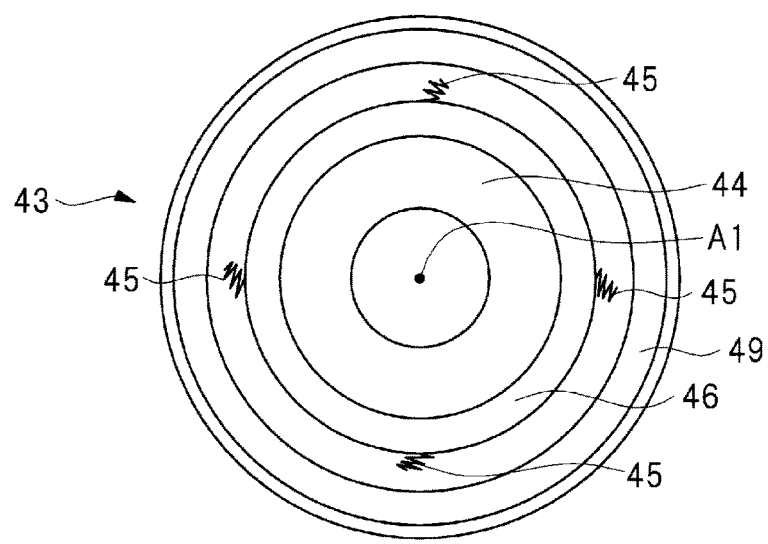
FIG. 4B is a side view illustrating another structural example of the dynamic damper.
Figure 5:
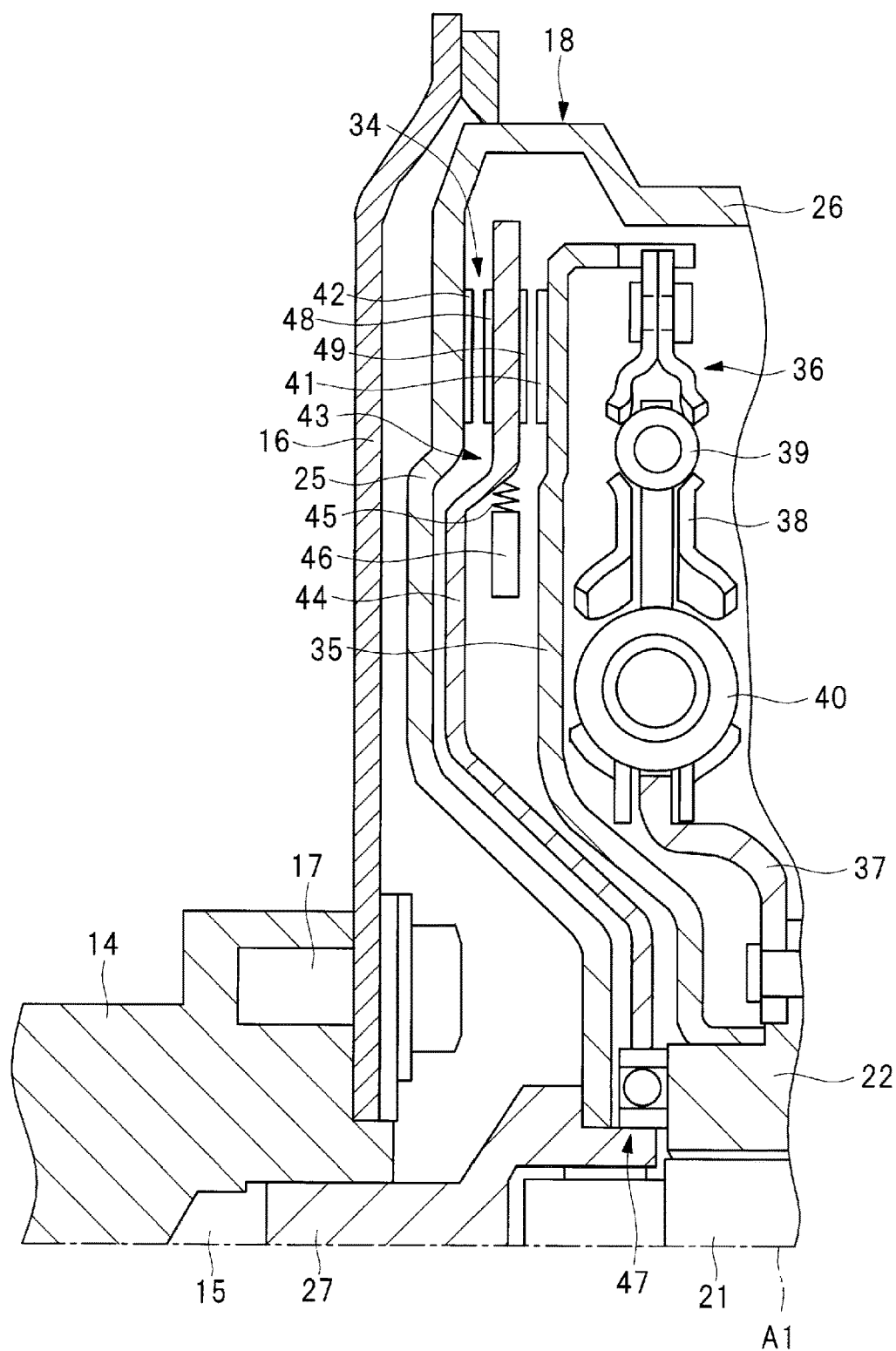
FIG. 5 is an enlarged cross-sectional view illustrating another structural example of the dynamic damper provided on the torque converter.

Another structural example of the dynamic damper 43 will be described with reference to FIG. 4B and FIG. 5. The dynamic damper 43 illustrated in FIG. 4B and FIG. 5 is different from the dynamic damper 43 illustrated in FIG. 2 and FIG. 3 in mounting position of the mass body 46 on the ring 44 compared with the dynamic damper 43 illustrated in FIG. 2 and FIG. 3. The mass body 46 of the dynamic damper 43 illustrated in FIG. 4B and FIG. 5 is attached inside the friction members 48 and 49 in the direction of radius of the ring 44 via a plurality of resilient members 45. The plurality of resilient members 45 are metallic helical extension springs, and the mass body 46 has an annular shape. In FIG. 4B and FIG. 5, the same elements as those illustrated in FIG. 2 and FIG. 3 are denoted by the same reference signs as those in FIG. 2 and FIG. 3.

The same configuration of the torque converter 13 illustrated in FIG. 5 as the torque converter 13 illustrated in FIG. 2 and FIG. 3 provides the same effects and advantages as those provided by the torque converter 13 illustrated in FIG. 2 and FIG. 3. Furthermore, the hydraulic control circuit 52 illustrated in FIG. 1 controls engagement and release of the lock-up clutch 34 illustrated in FIG. 5.

If the lock-up clutch 34 illustrated in FIG. 5 is released, in the same manner as the dynamic damper 43 illustrated in FIG. 2 and FIG. 3, the dynamic damper 43 illustrated in FIG. 5 acts neither on the engine 11 nor on the hub 22 as the inertia mass body in the direction of rotation.

In contrast, if the lock-up clutch 34 illustrated in FIG. 5 is engaged, the dynamic damper 43 illustrated in FIG. 5 acts as the inertia mass body in the direction of rotation on the hub 22 and the input shaft 21 in the same manner as the dynamic damper 43 illustrated in FIG. 2 and FIG. 3, so that the torque variations of the hub 22 and the input shaft 21 may be restrained.

Specifications of the dynamic damper 43 illustrated in FIG. 2 to FIG. 5, for instance, at least one of the mass of the mass body 46, rigidity of the resilient members 45, and the position where the mass body 46 is disposed in the radial direction may be tuned. The torque converter 13 in which the specifications of the dynamic damper 43 are tuned achieves a reduction in variations in rotation of the hub 22 and the input shaft 21, that is, a change in number of rotations and a change in torque per unit time at a desired frequency.

Figure 6:
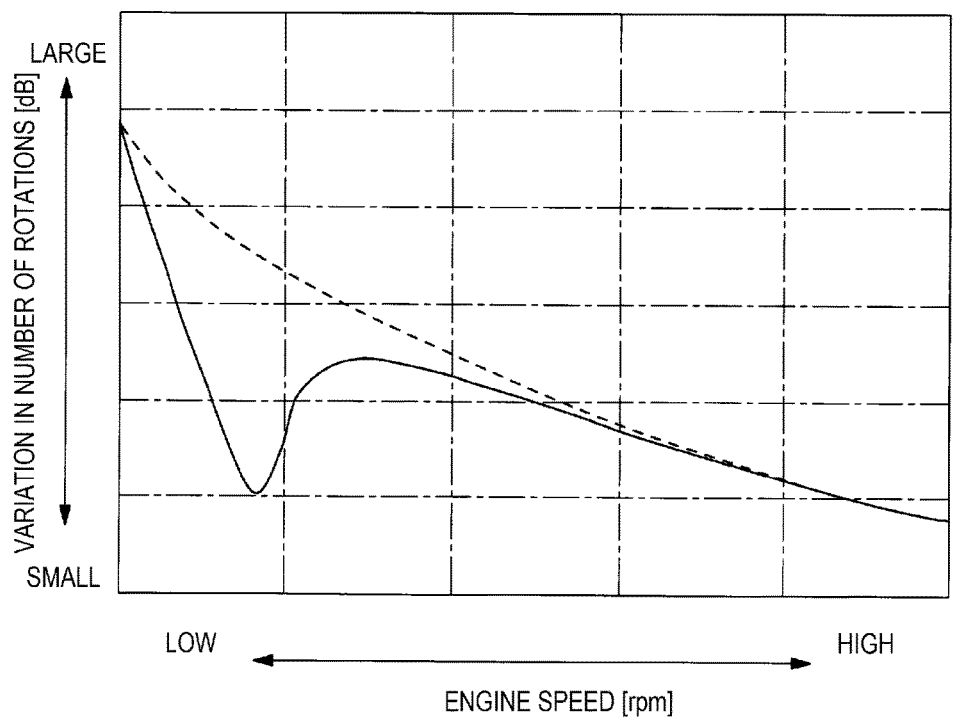
FIG. 6 is a graph illustrating a characteristic of the torque converter.

A characteristic of the torque converter 13 will be described with reference to FIG. 6. The characteristic of the torque converter 13 having the dynamic damper 43 is indicated by a solid line in FIG. 6, and a characteristic of a torque converter of a comparative example is indicated by a broken line in FIG. 6. The torque converter of the comparative example is not provided with a dynamic damper. In the graph in FIG. 6, a lateral axis indicates the engine speed, and a vertical axis indicates the variation in number of rotations of the input shaft. The variation in number of rotations of the input shaft is a value per unit time.

The torque converter of the comparative example has a characteristic such that the higher the engine speed, the smaller the variation in number of rotations of the input shaft. Irrespective of the engine speed, the torque converter 13 of the example provides the variation in number of rotations of the input shaft smaller than the variation in number of rotations of the input shaft in the comparative example. If the engine speed is a predetermined value B1, a difference between the variation in number of rotations of the input shaft of the example and the variation in number of rotations of the input shaft of the comparative example becomes maximum.

In one implementation, the front cover 18 and the rear cover 19 described in the example correspond to a first rotating element, the hub 22 and the input shaft 21 correspond to a second rotating element, the torque converter 13 corresponds to a fluid transmission device, the dynamic damper 43 corresponds to a first damping mechanism, and the friction members 48 and 49 and the ring 44 correspond to a coupling mechanism. In other words, the ring 44 serves both as an element of the coupling mechanism, and an element of the first damping mechanism. In one implementation, the friction member 42 corresponds to the first friction member, the friction member 41 corresponds to the second friction member, and the lock-up piston 35 corresponds to a movable element. In one implementation, the torsional damper 36 corresponds to the second damping mechanism.

The fluid transmission device is not limited to the above-mentioned example, but can be modified in various forms without departing from the gist of the present invention. For instance, the fluid transmission device may employ a structure in which the friction member 41 of the lock-up clutch 34 is directly pressed against the friction member 42 and a structure in which the dynamic damper is disposed inside the friction members 41 and 42 as a modification of the dynamic damper 43 in FIG. 4B and FIG. 5. In the modification of the dynamic damper, the friction members 48 and 49 are disposed inside a range where the friction members 41 and 42 are disposed in the direction of radius of the ring 44.

According to the modification of the dynamic damper, if the lock-up clutch 34 is released, the friction member 41 and the friction member 42 are apart from each other. The friction member 48 is apart from the side surface of the base portion 25, and the friction member 49 is apart from the side surface of the lock-up piston 35.

The lock-up clutch 34 then engages, that is, when the friction member 41 is pressed against the friction member 42, simultaneously, the friction member 48 is pressed against the side surface of the base portion 25 and the friction member 49 is pressed against the side surface of the lock-up piston 35, whereby the dynamic damper acts as the inertia mass body in the direction of rotation on both of the engine 11 and the hub 22. The mass body used in the dynamic damper may be a mass body divided into a plurality of pieces in the direction of rotation instead of the annular mass body.

It is also possible to provide a pendulum damper instead of the dynamic damper. The pendulum damper has a structure in which a mass body swingable in the direction of rotation of the ring 44 about a supporting shaft is mounted on the ring 44. When the torque of the engine 11 varies, the mass body acts as a pendulum to absorb or attenuate vibrations of the hub 22 and the input shaft 21. If the specifications of the pendulum damper, for instance, a length of the pendulum about the supporting shaft and the mass of the mass body are tuned, vibrations of hub 22 and the input shaft 21 of a desired order of rotation, for instance, secondary vibration of rotation may be restrained. In other words, the pendulum damper corresponds to the mass body. The control unit 53 may be either one of an electronic component such as a processor, a module, and the like instead of the microcomputer, and a unit including these electronic components assembled to each other.

The first rotating element and the second rotating element may be any one of a rotating member, a rotating shaft, a gear, a pulley, and a sprocket. The movable element may be any of a piston, and a rotating member. The resilient member of the first damping mechanism may be either one of a metallic spring and a synthetic rubber. The fluid transmission device includes a torque converter provided with a function of amplifying torque and, in addition, a fluid coupling that does not have a function of amplifying the torque.

The invention claimed is:

1. A fluid transmission device capable of transmitting power between a first rotating element and a second rotating element by kinetic energy of a fluid and capable of transmitting power between the first rotating element and the second rotating element via a lock-up clutch, the fluid transmission device comprising:
   a first damping mechanism including a rotating body disposed in a path for transmitting power between the first rotating element and the second rotating element via the lock-up clutch for restraining variations in rotation of the second rotating element, and
   a coupling mechanism configured to release the first damping mechanism from the first rotating element and the second rotating element when the lock-up clutch is released and couple the first damping mechanism to the first rotating element and the second rotating element when the lock-up clutch is engaged, wherein
   the lock-up clutch comprises a movable element mounted on the second rotating element and movable in a direction of an axial line toward the coupling mechanism to couple the first damping mechanism between the first rotating element and the second rotating element through the movable element when the lock-up clutch is engaged, the axial line being a center of rotation of the second rotating element, and
   the first damping mechanism further includes a support supporting the rotating body freely rotatable independently of at least the second rotating element when the lock-up clutch is disengaged.

2. The fluid transmission device according to claim 1, wherein the lock-up clutch further comprises:
   a first friction member disposed on the first rotating element; and
   a second friction member disposed on the movable element,
   wherein engagement of the lock-up clutch is a state in which power transmission between the first friction member and the second friction member is enabled,
   wherein release of the lock-up clutch is a state in which power transmission between the first friction member and the second friction member is blocked,
   wherein the first damping mechanism is apart from the first friction member and the second friction member when the lock-up clutch is released, and
   wherein the first damping mechanism is coupled to the first friction member and the second friction member when the lock-up clutch is engaged.

3. The fluid transmission device according to claim 2, further comprising a second damping mechanism configured to couple the movable element and the second rotating element, and restrain the variations in rotation of the second rotating element,
   wherein the movable element is rotatable with respect to the second rotating element about the axial line.

4. The fluid transmission device according to claim 3, wherein the first damping mechanism comprises:
   a ring, which is the rotating body, mounted on the first rotating element through the support, the ring being rotatable about the axial line; and
   a mass body mounted on the ring and pivotable in the direction of rotation of the ring,
   wherein the ring moves away from the first friction member and the second friction member when the lock-up clutch is released, and
   wherein the ring is coupled to the first friction member and the second friction member when the lock-up clutch is engaged.

5. The fluid transmission device according to claim 4, wherein the mass body is disposed outside the ring in a radial direction about the axial line.

6. The fluid transmission device according to claim 4, wherein the mass body is disposed inside the ring in the radial direction about the axial line.

7. The fluid transmission device according to claim 2, wherein the first damping mechanism comprises:
   a ring, which is the rotating body, mounted on the first rotating element through the support, the ring being rotatable about the axial line; and
   a mass body mounted on the ring and pivotable in the direction of rotation of the ring, wherein the ring moves away from the first friction member and the second friction member when the lock-up clutch is released, and wherein the ring is coupled to the first friction member and the second friction member when the lock-up clutch is engaged.

8. The fluid transmission device according to claim 7, wherein the mass body is disposed outside the ring in a radial direction about the axial line.

9. The fluid transmission device according to claim 7, wherein the mass body is disposed inside the ring in the radial direction about the axial line.

10. A fluid transmission device capable of transmitting power between a first rotating element and a second rotating element by kinetic energy of a fluid and capable of transmitting power between the first rotating element and the second rotating element via a lock-up clutch, the fluid transmission device comprising:
   a first damping mechanism disposed in a path for transmitting power between the first rotating element and the second rotating element via the lock-up clutch for restraining variations in rotation of the second rotating element, and
   a coupling mechanism configured to release the first damping mechanism from the first rotating element and the second rotating element when the lock-up clutch is released and couple the first damping mechanism to the first rotating element and the second rotating element when the lock-up clutch is engaged, wherein
   the lock-up clutch comprises:
      a movable element mounted on the second rotating element and movable in a direction of an axial line, which is a center of rotation of the second rotating element;
      a first friction member disposed on the first rotating element; and
      a second friction member disposed on the movable element,
   engagement of the lock-up clutch is a state in which power transmission between the first friction member and the second friction member is enabled,
   release of the lock-up clutch is a state in which power transmission between the first friction member and the second friction member is blocked,
   the first damping mechanism is apart from the first friction member and the second friction member when the lock-up clutch is released,
   the first damping mechanism is coupled to the first friction member and the second friction member when the lock-up clutch is engaged,
   the first damping mechanism comprises:
      a ring mounted on the first rotating element so as to be rotatable about the axial line; and
      a mass body mounted on the ring and pivotable in the direction of rotation of the ring,
   the ring moves away from the first friction member and the second friction member when the lock-up clutch is released, and
   the ring is coupled to the first friction member and the second friction member when the lock-up clutch is engaged.

11. The fluid transmission device according to claim 10, further comprising a second damping mechanism configured to couple the movable element and the second rotating element, and restrain the variations in rotation of the second rotating element,
   wherein the movable element is rotatable with respect to the second rotating element about the axial line.

12. The fluid transmission device according to claim 10, wherein the mass body is disposed outside the ring in a radial direction about the axial line.

13. The fluid transmission device according to claim 10, wherein the mass body is disposed inside the ring in the radial direction about the axial line.

14. A fluid transmission device capable of transmitting power between a first rotating element and a second rotating element by kinetic energy of a fluid, the first rotating element being coupled to an input rotating shaft and the second rotating element being coupled to an output rotating shaft, the fluid transmission device comprising:
   a lock-up clutch coupled to the second rotating element and the output rotating shaft, the lock-up clutch being configured to couple the first rotating element and the second rotating element to transmitting power from the input rotating shaft to the output rotating shaft through the lock-up clutch;
   a damper including
      a damping mechanism disposed in a path for transmitting power between the first rotating element and the second rotating element through the lock-up clutch for restraining variations in rotation of the second rotating element, and
      a support for the damping mechanism, the support being configured to be freely rotatable independently of at least the output rotating shaft around a rotation axis of the input and output rotating shafts;
   a coupling mechanism configured to release the damping mechanism from the first rotating element and the second rotating element when the lock-up clutch is released and couple the damping mechanism to the first rotating element and the second rotating element when the lock-up clutch is engaged.

\* \* \* \* \*